United States Patent Office 3,089,958
Patented May 14, 1963

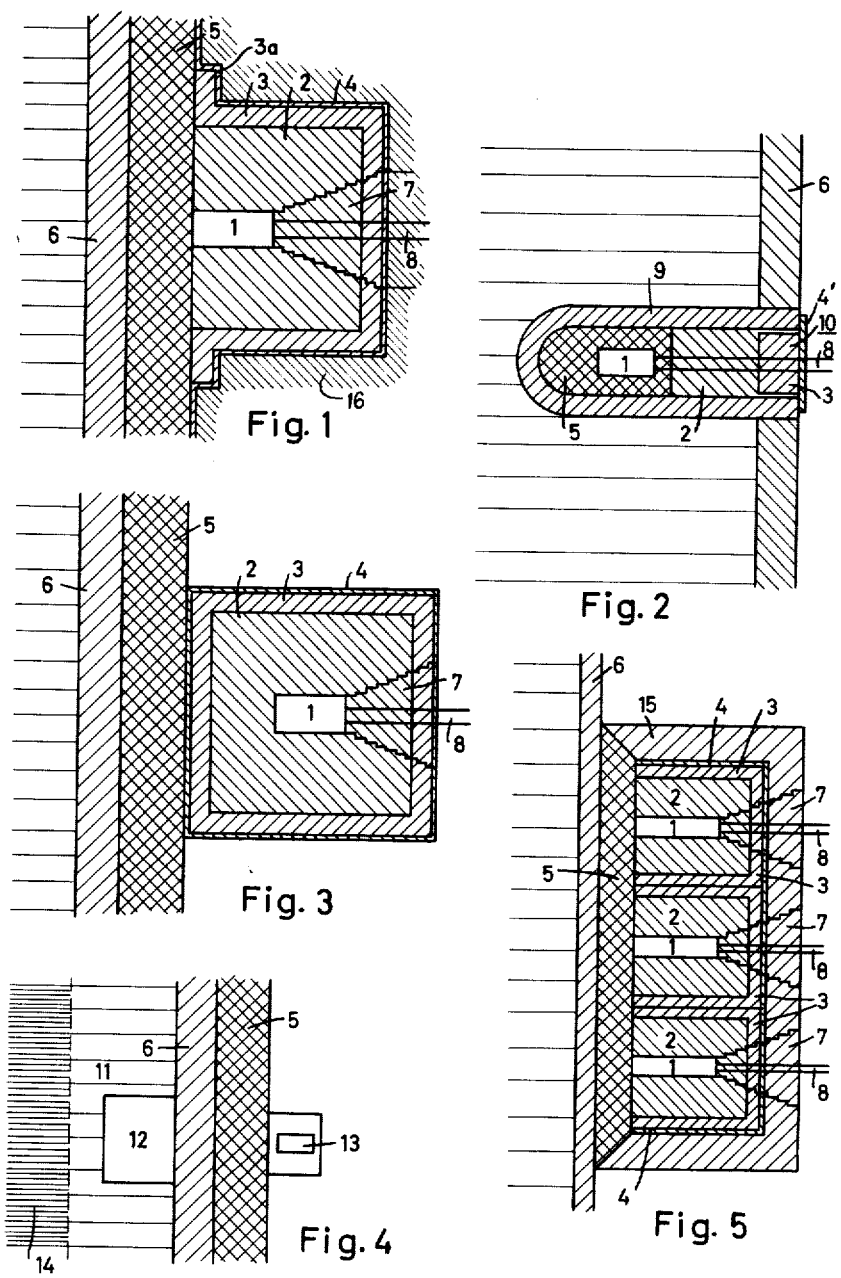

3,089,958
JACKETED NEUTRON-FLUX MEASURING GAGE FOR NUCLEAR REACTORS
Karl Janner, Erlangen, Germany, assignor to Siemens-Schuckertwerke Aktiengesellschaft, Berlin-Siemensstadt and Erlangen, Germany, a German corporation
Filed Nov. 21, 1958, Ser. No. 775,405
Claims priority, application Germany Nov. 27, 1957
24 Claims. (Cl. 250—83.1)

My invention relates to neutron sensing gages for measuring and continuously controlling the neutron flux of nuclear reactors. Used for these purposes are a variety of neutron detectors, for example proportional counters and ionization chambers. Particularly important is an accurate response to the neutron flux in reactor start-up and continuous normal operations. Increased difficulties are encountered when the reactor, after previous operation, remained shut down temporarily and is again to be started up. The reactor and the activated construction components then emit an extensive gamma radiation which considerably falsifies the measurement of the neutron flux detectors.

It is known to minimize such faults by shielding the detector with a gamma absorber layer, for example in form of a plate or coating, which increases the ratio of useful neutron radiation to detrimental gamma radiation. Also of fundamental importance to the measurement, particularly in quantitative respects, is the location of the detectors. In reactors with a reactor vessel, the measuring detectors may be mounted either within or on the exterior side of the vessel. In the former case it is easy to operate within the range of sufficiently great neutron-flux densities, but considerable constructive and operational difficulties are encountered particularly with power reactors. These difficulties are avoided when the detectors are mounted outside the reactor vessel. Then however, only relatively slight flux densities are available for the measurement because the emergent neutron flux, particularly that of the thermal neutrons, is considerably attenuated by the material of the vessel wall, particularly in the case of a large wall thickness. For that reason, and aside from the above-mentioned qualitative expedient of providing a gamma absorber layer, additional quantitatively effective expedients must be observed for obtaining with an exterior detector a response to a largest feasible extent in proportion to the neutron radiation emerging out of the reactor.

In nuclear reactors, the reflector, for example, is a known means for reducing the neutron losses toward the outside.

It is an object of my invention to provide nuclear detectors with neutron-flux measuring gages which afford optimum efficiency of response to the available neutron flux at a minimum of expenditure in material and space, and which also exclude to a great extent such other disturbing influences upon the measurement as may be due to laterally incident gamma radiation or to coupling phenomena between several closely adjacent neutron gages.

To achieve these objects, and in accordance with a feature of a preferred form of my invention, I include or embed the neutron detector, preferably a detector responsive to thermal neutrons and provided with a gamma radiation absorber, in three functionally different layers of which one is a moderator substance of great diffusion length, a second layer is a reflector substance of small diffusion length, and the third layer is a strong neutron absorber. The individual neutron detectors thus jacketed are disposed together with the gamma radiation absorber in the interspace between the reactor vessel and the biological shielding of the reactor.

It is noted that the term "diffusion length" signifies a specific property of the type of material, and not of its thickness.

The foregoing and other objects, advantages, and features of my invention will be apparent from, and will be described in, the following with reference to the drawing showing by way of example a number of embodiments of my invention.

On the drawing:

FIG. 1 is a longitudinal section of a jacketed gage for measuring the neutron flux of a reactor with respect to all neutron energies present.

FIG. 2 is a longitudinal section of another embodiment, modified in comparison to FIG. 1 by mounting the neutron detector within an immersion tube.

FIG. 3 is a longitudinal section of a jacketed gage for measuring the fast-neutron flux.

FIG. 4 is a longitudinal section of a measuring gage mounted near a hollow space formed within the reflector of the nuclear reactor; and FIG. 5 shows in longitudinal section a number of gages according to FIG. 1 having an envelope in common.

In the gage according to FIG. 1, the neutron detector 1 proper is particularly responsive to slow neutrons. It may consist of any type of detector available for such purpose, such as a boron-lined or $BF_3$-filled ionization chamber or a proportional counter. Such devices, as well as other detectors suitable for the purposes of the present invention, are known as such and described, for instance, in the book "Nuclear Engineering" edited by Charles F. Bonilla, published by McGraw-Hill Book Co. Inc., 1957, New York, chapter IV, pages 102–132. The gage is embedded in three layers 2, 3 and 4 of functionally different character. The inner layer 2 consists of a moderator substance of great diffusion length, for example $D_2O$, carbon such as in form of graphite, or beryllium. The middle layer 3 forms a mounting flange at 3a and consists of reflector substance of small diffusion length in comparison with the above-mentioned moderator substance. The reflector substance of layer 3 may consist of light water, paraffin, or polyethylene. Polyetheylene is preferable because of its high melting point. The outermost layer 4 consists of a strong neutron absorber and is formed, for example, by a coating of boron.

The term "diffusion length" in the present case relates to the diffusion length for thermal neutrons. This term is used in the same sense as in the book by S. Glastone and M. C. Endlund, "Elements of Nuclear Reactor Series," 5th edition, page 115 and following. For example, the diffusion length for thermal neutrons in heavy water $D_2O$ is 116 cm., and in light water $H_2O$ is is 273 cm.

The detector 1 is directly adjacent to a gamma absorber plate 5 consisting, for example, of a plate of bismuth. The fastening means for the detector and its jackets, such as suitable screw bolts, are not illustrated. The absorber plate 5 is adapted to the shape of the reactor vessel and is directly in face-to-face contact with the vessel wall 6 of the reactor. A stopper 7 is placed behind the detector 1 and has channels traversed by the electric connecting leads 8. The stopper 7, being composed of the same materials as the layers 2, 3 and 4, permits exchanging the detector 1.

The direct contact engagement of the detector 1 with the gamma absorber plate 5 is required because the detector is to respond to the entire neutron flux, including the thermal neutrons, emerging through the absorber. For that reason, the reflector layer 3 and the neutron absorber layer 4 are omitted at this particular location where they would be detrimental. The neutrons passing through the wall 6 of the reactor vessel, impinge together with the gamma radiation onto the gamma absorber 5 in which the gamma radiation is weakened as much as is permitted by the admissible amount of concurrent attenuation of the neutron flux. The emerging neutrons penetrate into the space filled by the moderator substance 2 in which any remaining fast neutrons are slowed down to thermal speeds. Due to the great diffusion length of the moderator substance, the neutron detector 1, acting as a neutron sink, also responds to those neutrons that occur in moderator zones relatively remote from the detector.

The reflector substance 3 has the predominant quantitative effect upon the measuring result. If the reflector substance 3 were not present, the moderator substance 2 would have to be given very large dimensions for reasons of neutron economy. Furthermore, when using several neutron detectors in close vicinity to each other, they would be mutually coupled by the neutron flux, and this could render the individual measurements valueless, particularly when removing or adding new detectors. In contrast, not only a considerable reduction in moderator volume, but also an effective de-coupling are obtained by surrounding the moderator layer 2 with the reflector layer 3.

The thickness of the reflector layer 3 can be kept small, depending upon the reflector substance being used and upon the desired percentage of reflectively dispersed neutrons, the fast neutron being additionally subjected to moderation. When using light water as reflector, a layer thickness of 5 cm. suffices for obtaining a reflective dispersion of neutrons of approximately 80%. The remaining 20% are dissipated by absorption in the reflective layer. When using heavy water or carbon as reflector substance, the percentage of reflectively dispersed neutrons rises up to about 95%. In the latter case, however, a reflector layer of five to six times the above mentioned thickness is required. In the device shown in FIG. 1, for example, the dimensions of the cubic, prismatic or cylindrical jacket of layers may amount to 50 cm. in the horizontal direction and to about 70 cm. in the vertical direction.

The flange portion 3a of reflector 3 has the further purpose of preventing the neutron flux entering into the moderator 2 from being attenuated by the boron absorber 4 at the frontal marginal zone. If the flange portion 3a were omitted, the absorber layer 4 would terminate directly at the gamma absorber plate 5 at a distance of only one reflector thickness from the moderator. Any neutrons penetrating through the reflector 3 are absorbed in the absorber layer 4.

It will be understood that the above-described gage is mounted between the wall of the pressure vessel 6 of the reactor and the biological shield surrounding the reactor and consisting, for example, of suitable concrete. The shield is schematically indicated in FIG. 1 at 16.

In the embodiment according to FIG. 2, the neutron detectors together with the correspondingly modified jacketing, is mounted within a tube 9, for example of steel and of relatively small wall thickness (shown exaggerated) so as to form a probe or gage that can be inserted from the outside through the vessel wall 6 of the reactor into the particular reactor portion under observation, for example in the vicinity of the reactor core. This results in a quantitative improvement of the measuring operation because the gage is located in a zone of high neutron-flux density. The gamma absorber layer 5 surrounds the detector 1 and fills the closed end portion of the tube 9. Next following toward the outside is the moderator layer 2 and the reflector 3. The reflector is designed as a stopper 10 and carries the neutron absorber 4. Since the moderator 2 does not surround the detector 1 on all sides, although this can be obtained by giving the immersion tube 9 suitably larger dimensions, the tube 9 must be surrounded on all sides in the interior of the reactor vessel by a moderator substance which, in the illustrated example, is formed by the moderator of the reactor itself. If by virtue of the particular location of the device, the neutron flux already preponderates over the gamma flux, the gamma absorber 5 can be omitted and the space shown occupied thereby in FIG. 2 may be filled by the moderator substance 2. This, of course, is generally applicable and is not limited to the above described immersion-type device.

The device illustrated in FIG. 3 serves for measuring fast neutrons exclusively, and is of cubic shape. The neutron detector 1 is located in the center of the moderator layer or body 2 and is concentrically surrounded in succession by a reflector layer 3 and a neutron absorber layer 4. One of the cube faces of the absorber 4 for thermal neutrons is directly in contact with the gamma absorber plate 5. This is permissible because in this case only fast neutrons are to be responded to. These are moderated in the moderator 2 in the manner already explained and are subsequently measured by the detector 1. With respect to the functioning of the reflector 3 as a reflecting disperser and de-coupler, the explanations given above with reference to FIG. 1 are also applicable. In the present case a particularly good moderator, for example $D_2O$, is preferably used.

The number of the neutrons entering into the measuring operation in the devices so far described can be increased quantitatively if the reflector provided in the reactor vessel for the normal nuclear reaction, is locally omitted or given a smaller or variable wall thickness in the action range of the individual neutron flux measuring gages. This is preferably done in the case of thick-walled reactor vessels in which a particularly large portion of the neutrons is absorbed in the wall material.

The device illustrated in FIG. 4 exemplifies the just mentioned modification. The reflector 11 of the reactor is provided with a reflectorless space 12 adjacent to the inner side of the reactor-vessel wall 6. Consequently, at this location a correspondingly great flow of neutrons, particularly fast neutrons, can penetrate through the vessel wall 6. Hence, the measuring gage 13 which is provided with a multi-layer jacket (not shown in FIG. 4) according to FIG. 1 or 3, is subjected to a neutron flux of correspondingly greater intensity. The reflector 11 of the reactor is adjacent to the fuel-containing reactor core 14. If the reflector 11 in the reactor consists of solid substance, for example graphite, the space 12 is simply left vacant and is formed merely by a recess in a graphite block. When using a liquid reflector, for example $D_2O$, the space 12 is provided by inserting a stationary hollow or massive nonreflective body.

With full rated operation of the reactor, the material of the reactor vessel 6 adjacent to the nonreflective space 12 or "vacancy" may be subjected to excessive radiation damage. It is therefore preferable to slow the neutrons in this zone, but not down to thermal energy because this would unduly increase the asborption losses in the wall material.

Instead of using fixed non-refective bodies, such bodies may also be mounted movably and may then be introduced into the reflector of the reactor when and where needed.

Furthermore, the volume occupied by the space 12 can me made variable. For this purpose, for example, a cubic body may be inserted into the liquid reflector of the reactor at the measuring location and may be given a bottom formed by a perforated sheet or screen on which an electric heater winding is mounted. The hollow body, filled with reflector liquid, can be gradually emptied through the perforations by heating and evaporating the enclosed reflector liquid prior to performing a neutron-flux measuring operation. The displacement of the reflector liquid from the hollow space 12 may also be effected by supplying gas under pressure into the hollow body.

Aside from a change in volume, a control of the neutron absorption is obtained if the cross-section of a movable non-reflective body as described above is made variable. This can be done, for example, by forming the reflector vacancy 12 of two wedge-shaped bodies placed one beside the other, and displacing one wedge relative the other to thereby vary the total thickness in the direction toward the gage.

When the hollow space or vacancy 12 is fully effective, it also results generally in extending the measuring range of the neutron-flux detecting device. Thus an increase of the measuring range approximately by the factor $10^2$ can be obtained with respect to the flux of fast neutrons. This makes it possible to cover the large measuring range required for a reactor with the aid of fewer, differently ranged measuring gages than otherwise needed, or to obtain a greater overlapping of the respective measuring ranges of the flux gages.

In practice, a single reflector vacancy such as a non-reflective body or empty chamber may be provided for two or more neutron flux gages having adjacent or somewhat overlapping measuring ranges. If the non-reflective body or chamber is located in front of the more sensitive gage having the lower measuring range, the shifting of the non-reflective body or chamber so as to place it in front of the less sensitive gage causes the upper measuring range of the more sensitive device to expand upwardly and the range of the less sensitive gage to widen downwardly. The above-mentioned features relating to the provision of non-reflective zones or vacancies within the reflector of the nuclear reactor are not limited to flux gages with a multi-layer jacket as described above, but the advantages of such vacancies features are particularly pronounced with gages according to the invention.

As described, the embodiments according to FIGS. 1, 2 and 3 comprise a gamma absorber plate separate from the jacketing proper of the neutron detector, the absorber plate being located between the wall of the reactor vessel and the biological shield. Consequently, when such a neutron detector is mounted in a marginal zone of the gamma absorber plate, care must be taken to provide for attenuation of any laterally incident gamma radiation. In such case, therefore, the above-described jacket is provided, on all sides other than that of the gamma absorber plate, with an additional γ-n-envelope. That is, the envelope consists of substance which absorbs neutrons as well as gamma radiation, iron being suitable for this purpose for example. When providing such an envelope, the neutron absorber layer 4 of the jacket may be omitted. Furthermore, the gamma absorber plate, neutron detector, jacket and envelope can be combined to a single, and if desired, transportable unit.

Furthermore, several flux detectors with an envelope as described above may be provided with a common envelope structure for absorption of gamma radiation and neutrons as is exemplified by the embodiment illustrated in FIG. 5. According to FIG. 5 three jacketed neutron-flux detectors 1 of the type shown in FIG. 1 are mounted directly adjacent to each other on a common gamma absorber plate 5 and are surrounded by a common γ-n-absorber envelope 15. The neutron absorber does not extend between the reflector jackets 3. The individual stoppers 7 are enlarged by the layer thickness of the envelope 15.

In all embodiments described above, the neutron absorber layer of the envelope or jacket can be dispensed with if the reactor is provided with a sufficiently effective biological shield. Furthermore, flux-measuring gages according to the invention are also applicable with reactor types other than those having a pressure vessel.

I claim:

1. With a source of neutron flux, in combination, a neutron-flux measuring gage, comprising a neutron-flux detector and a layered structure at least partly enclosing said detector, the structure at least enclosing the detector on the sides other than the one nearest the source of neutrons, said structure including a layer adjacent the detector composed of a moderator substance of great diffusion length for thermal neutrons, and including an outer layer of neutron absorber, the structure also including material which is neutron reflective situated between said moderator material and said outer layer, and including the case where the moderator substance and the neutron reflective material are the same material, which latter material is of sufficient thickness to have both moderator and neutron reflector functions, the moderator converting fast to thermal neutrons, said layers being contiguous and consecutive.

2. With a source of neutron flux, in combination, a neutron-flux measuring gage, comprising a neutron-flux detector and a layered structure at least partly enclosing said detector, the structure at least enclosing the detector on the sides other than the one nearest the source of neutrons, said structure including a layer adjacent the detector composed of a moderator substance of great diffusion length for thermal neutrons, and including an outer layer of neutron absorber, the structure also including material which is neutron reflective situated between said moderator material and said outer layer, and including the case where the moderator substance and the neutron reflective material are the same material, which latter material is of sufficient thickness to have both moderator and neutron reflector functions, the moderator converting fast to thermal neutrons, the moderator alone of said layers enclosing the detector on all sides, to provide an apparatus responsive only to fast neutrons in the flux source being measured, said layers being contiguous and consecutive.

3. With a source of neutron flux, in combination, a neutron-flux measuring gage, comprising a neutron-flux detector and a layered structure at least partly enclosing said detector, the structure at least enclosing the detector on the sides other than the one nearest the source of neutrons, said structure including a layer adjacent the detector composed of a moderator substance of great diffusion length for thermal neutrons, and including an outer layer of neutron absorber, the structure also including material which is neutron reflective situated between said moderator material and said outer layer, and including the case where the moderator substance and the neutron reflective material are the same material, which latter material is of sufficient thickness to have both moderator and neutron reflector functions, the moderator converting fast to thermal neutrons, the moderator layer being taken from the group consisting of heavy water, carbon, and beryllium, the reflective material being taken from the group consisting of light water, heavy water, carbon, paraffin, and polyethylene; and, where the same material is chosen for both the moderator and reflective material, the thickness being chosen sufficient to have both moderator and reflector functions, said layers being contiguous and consecutive.

4. The apparatus defined in claim 3, the moderator alone of said layers enclosing the detector on all sides, to provide an apparatus responsive only to fast neutrons in the flux source being measured.

5. A neutron-flux measuring gage, comprising a neutron-flux detector and a composite jacket structure enclosing said detector and comprising three contiguous, consecutive layers, the one of said layers nearest the detector consisting of moderator substance of given diffusion length for thermal neutrons, a second and intermediate one of said layers consisting of reflector substance of substantially smaller diffusion length for thermal neutrons than said moderator substance, and the outer third layer being a neutron absorber, the moderator substance slowing down any remaining fast neutrons to thermal speeds, the reflector causing a reflective dispersion of neutrons.

6. A neutron-flux detector for use with a reactor, comprising a tubular housing for insertion into the reactor, said housing having a closed end at the side to be inserted, a body of gamma absorber substance filling a portion of said housing adjacent to said end, said detector being embedded entirely in said gamma absorber substance, a moderator-substance layer of given diffusion length for thermal neutrons located in said housing axially adjacent to said gamma absorber substance, a layer of reflector substance of smaller diffusion length than said moderator substance located in said housing axially adjacent to said moderator layer, and an outer layer of neutron absorber substance, the moderator substance slowing down any remaining fast neutrons to thermal speeds, the reflector causing a reflective dispersion of neutrons.

7. With a nuclear reactor having a reactor vessel, in combination, a gamma-radiation absorber plate mounted on said vessel, and a neutron-flux measuring gage on said gamma-radiation absorber plate, said gage comprising a neutron-flux detector and a composite jacket structure about said detector and comprising three contiguous, consecutive layers, the one of said layers nearest the detector consisting of moderator substance of great diffusion length for thermal neutrons, the second and intermediate one of said layers consisting of reflector substance of substantially smaller diffusion length, and the outer third layer being a neutron absorber, the moderator substance slowing down any remaining fast neutrons to thermal speeds, the reflector causing a reflective dispersion of neutrons.

8. With a nuclear reactor having a reactor vessel and a biological shield surrounding said vessel, the combination of a neutron-flux measuring gage mounted between said vessel and said shield and comprising a neutron-flux detector and a composite jacket structure about said detector and comprising three contiguous, consecutive layers, the one of said layers nearest the detector consisting of moderator substance of great diffusion length for thermal neutrons, the second and intermediate one of said layers consisting of reflector substance of substantially small or diffusion length, and the outer third layer being a neutron absorber, the moderator substance slowing down any remaining fast neutrons to thermal speeds, the reflector causing a reflective dispersion of neutrons.

9. With a nuclear reactor having a reactor vessel, in combination, a gamma absorber plate mounted on said vessel, and a neutron-flux measuring gage on said absorber plate, said gage comprising a neutron-flux detector unit responsive to slow neutrons in contact with said absorber plate, to respond to the entire neutron flux, and a jacket structure enclosing said detector on all sides other than that of said gamma absorber plate, said jacket structure comprising three contiguous, consecutive layers of which the one near the detector consists of moderator substance of great diffusion length for thermal neutrons, a second and intermediate one of said layers consisting of reflector substance of small diffusion length, and the outer third layer being a strong neutron absorber, the moderator substance slowing down any remaining fast neutrons to thermal speeds, the reflector causing a reflective dispersion of neutrons.

10. In combination, a nuclear reactor having a reactor vessel, neutron reflector material adjacent the vessel wall at the inner side thereof, a gamma absorber plate mounted on the vessel wall at the outer side thereof, said reflector material having a neutron-permeable vacancy inwardly of and adjacent said gamma absorber plate, a neutron-flux measuring gage disposed on said absorber plate and comprising a slow neutron responsive detector directly opposite said vacancy and in direct contact with said absorber plate, and a structure enclosing said detector on all sides other than that of said gamma absorber plate, said jacket structure comprising three contiguous, consecutive layers of which the one nearest the detector consists of moderator substance of great diffusion length for thermal neutrons, a second and intermediate one of said layers consisting of reflector substance of substantially smaller diffusion length, and the outer third layer being a strong neutron absorber substance, the moderator substance slowing down any remaining fast neutrons to thermal speeds, the reflector causing a reflective dispersion of neutrons.

11. In combination, a nuclear reactor having a reactor vessel, neutron-flux measuring means mounted on the vessel wall, comprising a gamma absorber plate mounted on the outside of said wall, a plurality of neutron detector units each in contact with said plate in spaced relation to each other, a first inner jacket layer of moderator substance of great diffusion length for thermal neutrons surrounding each of said respective detectors, a second intermediate jacket layer of reflector substance of substantially smaller diffusion length surrounding each of said respective first layers, and an outer jacket layer of substance absorptive to neutrons and gamma radiation, said outer jacket layer jointly enclosing said detectors and the other jacket layers except on the side of said gamma absorber plate, and together with said absorber plate forming an enclosing envelope, the moderator substance slowing down any remaining fast neutrons to thermal speeds, the reflector causing a reflective dispersion of neutrons.

12. A neutron-flux gage according to claim 5, and further comprising a removable inwardly tapering stopper located behind said detector to permit exchange of said detector, said stopper having strata formed of parts of said three respective layers, said stopper and said layers having interfitting stepped surfaces.

13. The apparatus defined in claim 10, said neutron-permeable vacancy being formed by a non-reflective hollow device of controllably variable width dimension in the direction extending from said reactor vessel to said gage.

14. The apparatus defined in claim 7, said reactor vessel having neutron reflector material adjacent the inside wall thereof, said reflector material having a neutron-permeable vacancy inwardly of and adjacent said gamma-radiation absorber plate.

15. The apparatus defined in claim 7, said reactor vessel having neutron reflector material adjacent the inside wall thereof, said reflector material having a neutron-permeable vacancy inwardly of and adjacent said gamma-radiation absorber plate, said neutron-permeable vacancy being formed by a non-reflective hollow device of controllably variable width dimension in the direction extending from said reactor vessel to said gage.

16. The apparatus defined in claim 7, the moderator being graphite, the reflector being paraffin, the neutron absorber being boron.

17. The apparatus defined in claim 7, the moderator substance being taken from the group consisting of $D_2O$, graphite, and beryllium; the reflector substance being taken from the group consisting of light water, paraffin, and polyethylene; the neutron absorber being boron.

18. The apparatus defined in claim 9, said layer of reflector substance having an outer annular flange formed of said substance and in contact with said absorber plate, the said neutron absorber also covering said flange.

19. In a neutron-flux gage according to claim 5, for response to fast neutrons, said neutron detector being located in about the center of said moderator substance, and said reflector substance and said neutron absorber enclosing said moderator substance substantially in concentric relation to said detector.

20. In a neutron-flux gage according to claim 5, said jacket structure being cylindrical, said detector being located at one axial side of the cylinder and surrounded on all other sides by said moderator substance.

21. In a neutron-flux gage according to claim 5, said neutron absorber consisting of substance absorptive to neutrons as well as to gamma radiation.

22. A neutron-flux gage according to claim 5, and an envelope of gamma-radiation absorptive substance enclosing said jacket structure.

23. A neutron-flux gage according to claim 5, comprising a removable inwardly tapering stopper located behind said detector to permit exchange of said detector, said stopper having strata formed of parts of said three respective layers, said stopper and said layers having interfitting stepped surfaces.

24. A neutron-flux detector according to claim 6, said moderator-substance layer being located between said body and the wall of said housing, said two other layers being located in said housing axially behind said body and forming a removable stopper.

References Cited in the file of this patent

UNITED STATES PATENTS

| | | |
|---|---|---|
| 2,491,220 | Segre et al. | Dec. 13, 1949 |
| 2,506,944 | Stauffer et al. | May 9, 1950 |
| 2,521,656 | Serge et al. | Sept. 5, 1950 |
| 2,532,874 | Anderson | Dec. 5, 1950 |
| 2,556,768 | McKibben | June 12, 1951 |
| 2,716,705 | Zinn | Aug. 30, 1955 |
| 2,751,505 | Anderson | June 19, 1956 |
| 2,790,086 | Beyer et al. | Apr. 23, 1957 |
| 2,872,400 | Bugbee et al. | Feb. 9, 1959 |
| 2,911,343 | Braffort et al. | Nov. 3, 1959 |
| 2,933,605 | Ross et al. | Apr. 19, 1960 |
| 2,942,116 | Axelrod | June 21, 1960 |

FOREIGN PATENTS

| | | |
|---|---|---|
| 1,104,885 | France | June 22, 1955 |

OTHER REFERENCES

Hughes: Pile Neutron Research, Addison-Wesley Publ. Co., 1953, page 77.

UNITED STATES PATENT OFFICE
CERTIFICATE OF CORRECTION

Patent No. 3,089,958 May 14, 1963

Karl Jahner

It is hereby certified that error appears in the above numbered patent requiring correction and that the said Letters Patent should read as corrected below.

In the heading to the printed specification, line 8, for Nov. 27, 1957" read -- Nov. 22, 1957 --.

Signed and sealed this 26th day of November 1963.

(SEAL)
Attest:
ERNEST W. SWIDER

EDWIN L. REYNOLDS

Attesting Officer

Acting Commissioner of Patents